US008630958B2

(12) United States Patent
Carlsson et al.

(10) Patent No.: US 8,630,958 B2
(45) Date of Patent: Jan. 14, 2014

(54) SYSTEMS AND METHODS FOR MULTI-VEHICLE RESOURCE ALLOCATION AND ROUTING SOLUTIONS

(75) Inventors: John Gunnar Carlsson, St. Paul, MN (US); Holly Jin, San Jose, CA (US); Yinyu Ye, Menlo Park, CA (US)

(73) Assignee: Cardinal Optimization, Inc., Santa Clara, CA (US)

( * ) Notice: Subject to any disclaimer, the term of this patent is extended or adjusted under 35 U.S.C. 154(b) by 0 days.

(21) Appl. No.: 13/153,208

(22) Filed: Jun. 3, 2011

(65) Prior Publication Data

US 2012/0310691 A1  Dec. 6, 2012

(51) Int. Cl.
*G06Q 10/00* (2012.01)
(52) U.S. Cl.
USPC ......................................................... 705/338
(58) Field of Classification Search
USPC ......................................................... 705/338
See application file for complete search history.

(56) References Cited

U.S. PATENT DOCUMENTS

2009/0063035 A1   3/2009   Mandel et al.

FOREIGN PATENT DOCUMENTS

WO   WO 2009/059574 A1   5/2009
WO   WO 2009/092327 A1   7/2009

OTHER PUBLICATIONS

Carlsson, John Gunnar and Yinyu Ye. "Practical Distributed Vehicle Routing for Street-Level Map Scanning." Jan. 30, 2009, retrieved from [URL: http://menet.umn.edu/~jgc/CPP_newer.pdf].*
Perrier, et al. "Vehicle Routing for Urban Snow Plowing Operations." Transportation Science, vol. 42, No. 1, Feb. 2008, pp. 44-56.*
Carlsson, et al. "Finding Equitable Convex Partitions of Points in a Polygon Efficiently." Published Aug. 2010 in The ACM Transactions on Algorithms, vol. 6, No. 4, Article 72.*
International Search and Written Opinion dated Oct. 9, 2012 for International Application No. PCT/US2012/040578.

* cited by examiner

*Primary Examiner* — Susanna M Meinecke Diaz
(74) *Attorney, Agent, or Firm* — Morgan, Lewis & Bockius LLP

(57) ABSTRACT

A computer system for allocating and routing a plurality of servicing objects within a map of a region such that work load is balanced across the plurality of servicing objects is provided. The system formulates a model for allocating and routing the plurality of servicing objects in the region. The model comprises a distance matrix based upon a first plurality of segments or a second plurality of intersections in the map. The memory stores instructions for partitioning the map into a plurality of disjoint contiguous sub-regions in view of the distance matrix using an equitable convex region partition algorithm. The memory further stores instructions for calculating a corresponding tour graph for each sub-region in the plurality of sub-regions, where, for each respective sub-region in the plurality of sub-regions, a servicing object in the plurality of servicing objects is assigned to the tour graph that corresponds to the respective sub-region.

36 Claims, 13 Drawing Sheets

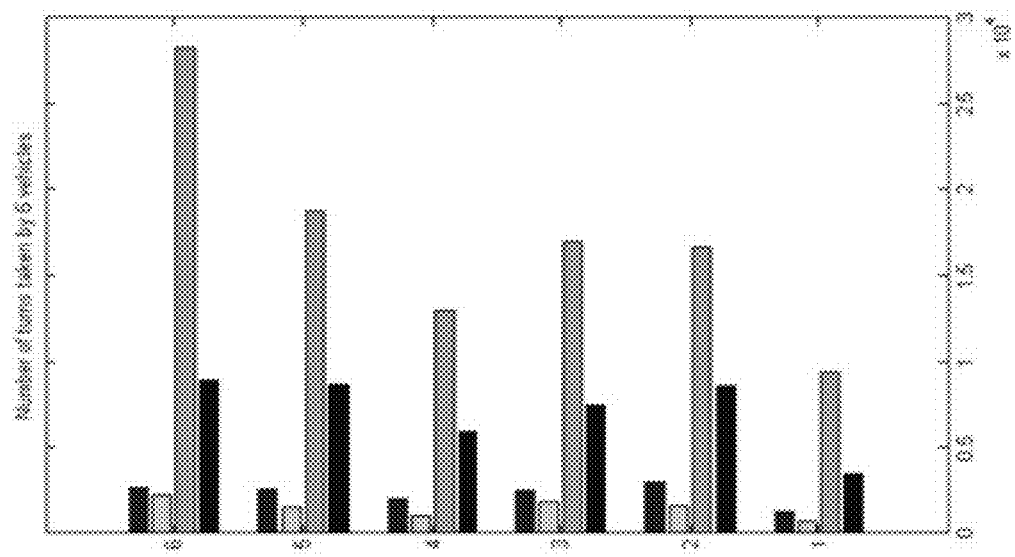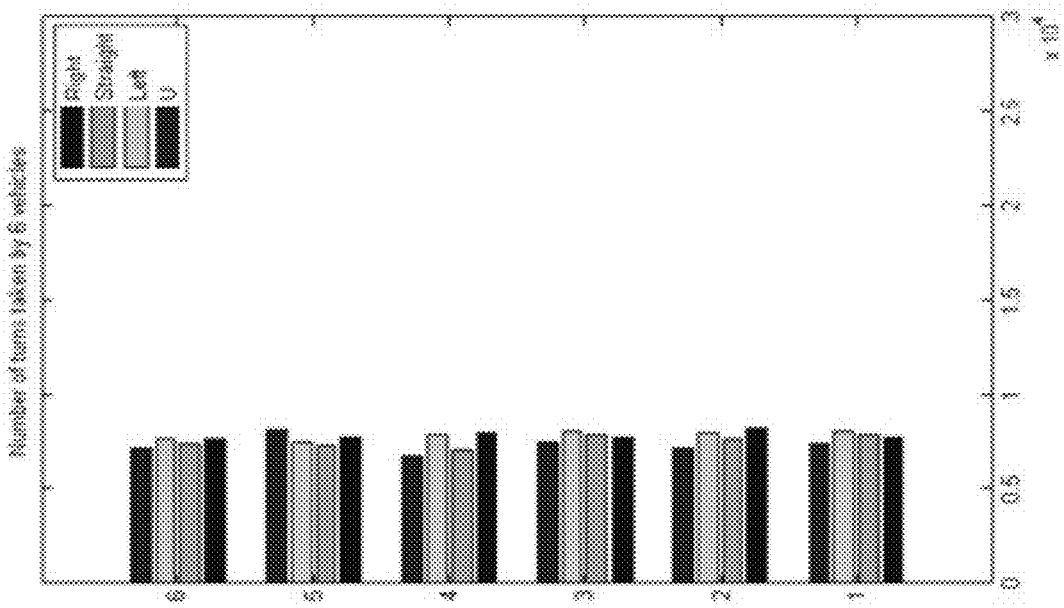
Fig. 11

SYSTEMS AND METHODS FOR MULTI-VEHICLE RESOURCE ALLOCATION AND ROUTING SOLUTIONS

1. FIELD OF THE INVENTION

The present application relates to systems and methods for optimally allocating and routing servicing objects within a region such that work load is balanced optimally across multiple vehicles and optimal routes are generated for each vehicle.

2. BACKGROUND

Two main problems are present in the art: 1) all-street scanning and 2) multi-location servicing. The all-street scanning problem is what MICROSOFT, GOOGLE and YAHOO face when trying to capture camera views of every street within a region and what mail delivery, and trash or recycle pickup operations encounter every day. There are many applications using a multi-location servicing model such as package delivery (UPS, FEDEX); other types of delivery services e.g. newspaper and service personnel dispatching.

Given the above importance of the above identified problems, what are needed in the art are improved systems and methods for addressing these problems.

3. SUMMARY

The present disclosure provides effective systems and methods for optimally allocating and routing servicing objects. These systems and methods are specifically directed to the allocation and routing of vehicles within a region and are designed for balancing work load optimally across multiple vehicles and generating an optimal route for each vehicle. In addition, there is built-in flexibility that allows for multiple vehicles to be dispatched from multiple depots with different operational or performance metrics such as distributing tasks evenly across resources or minimizing total cost.

Two main applications are targeted by the present systems and methods: (i) all-street scanning and (ii) multi-location servicing. The all-street scanning problem is what MICROSOFT, GOOGLE and YAHOO face when trying to capture camera views of every street within a region and what mail delivery, and trash or recycle pickup operations encounter every day. There are many applications using a multi-location servicing model such as package delivery (UPS, FEDEX); other types of delivery services e.g. newspaper and service personnel dispatching. The multi-location servicing problem is what many fleet management companies face when trying to assign a task to individual delivery vehicle and providing each vehicle with an optimal route. There are many applications using a multi-location servicing model such as package delivery (UPS, FEDEX); other types of delivery services e.g. newspaper and service personnel dispatching.

Specific exemplary opportunities that can be addressed by the system and methods of the present application include the case of a real estate agent. If the agent spends at least five minutes to figure out tours for client at least three times a days, then application of the systems and methods of the present disclosure translate to at least $200 equivalent of cost savings assuming a $40 per hour labor rate not to mention savings in fuel costs. In the case of a mail package distribution center, at least twenty minutes a day are spent figuring out tours mail delivery and ad hoc pick ups, then application of the systems and methods of the present disclosure provide the opportunity for real-time allocation of mail trucks and optimized zoning as well as substantial savings in fuel costs. In the case of a delivery truck, the systems and methods of the present disclosure allow for delivery efficiency depending on drivers' experience, optimized loading and unloading, shorter operation times and reduced fuel cost.

4. BRIEF DESCRIPTION OF THE DRAWINGS

Figure 8:
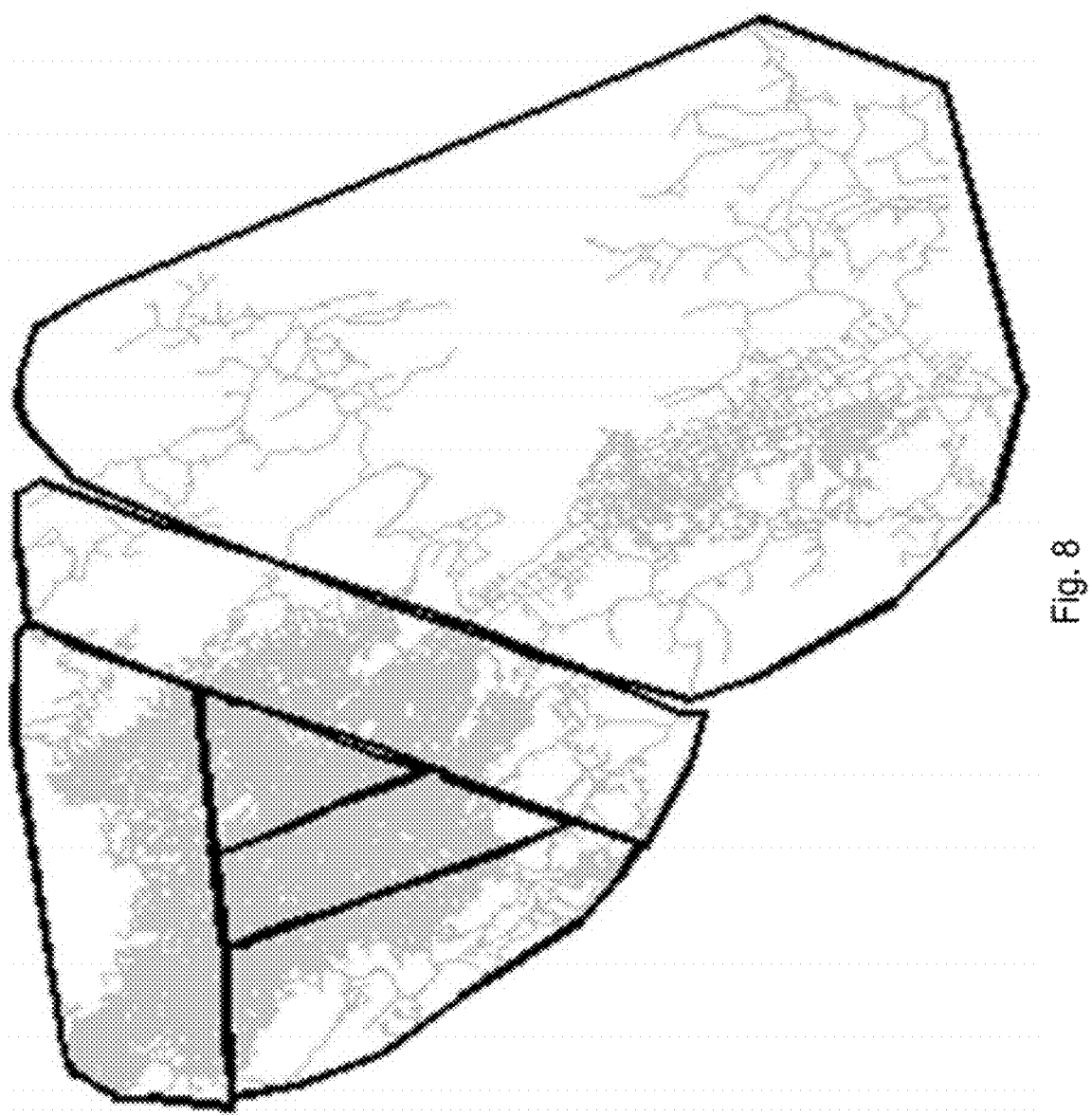
FIG. 8 illustrates a street scanning example using a Santa Clara, Calif. regional map after partitioning into six sub-regions in accordance with an example of the systems and methods of the present disclosure.
Figure 9:
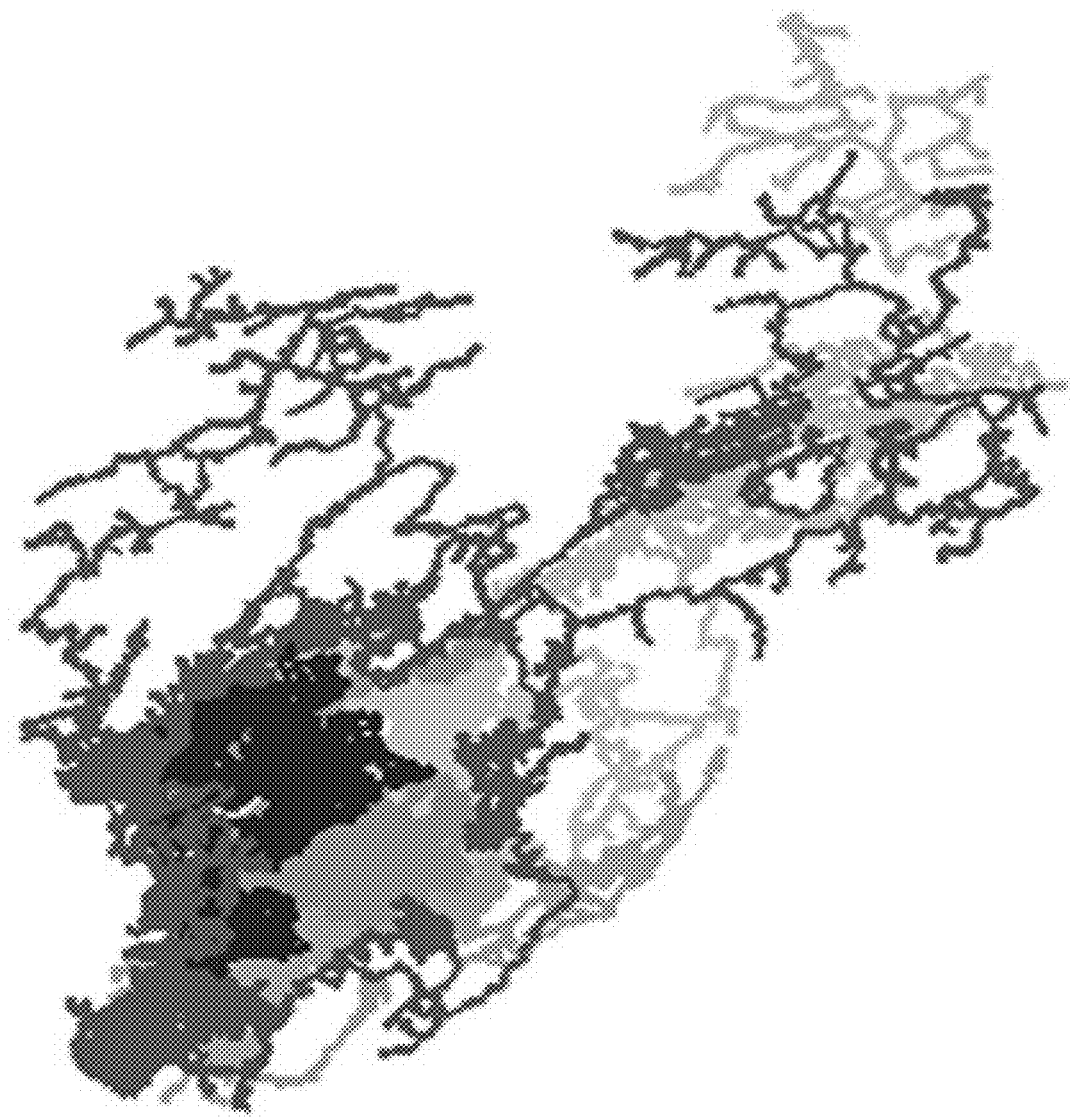
FIG. 9 illustrates how an individual route is computed for each of the six sub-regions of the map of FIG. 8 in accordance with the systems and methods of the present disclosure.

FIG. 11 provides side by side graphs that show the effectiveness of a turning cost minimization algorithm in accordance with the systems and methods of the present disclosure for the six-subregions of FIGS. 8 and 9.

Like reference numerals refer to corresponding parts throughout the several views of the drawings.

5. DETAILED DESCRIPTION

The present disclosure details novel advances over known systems and methods for optimally allocating and routing servicing objects within a region such that work load is balanced optimally across multiple vehicles optimal routes are generated for each vehicle.

Figure 1:
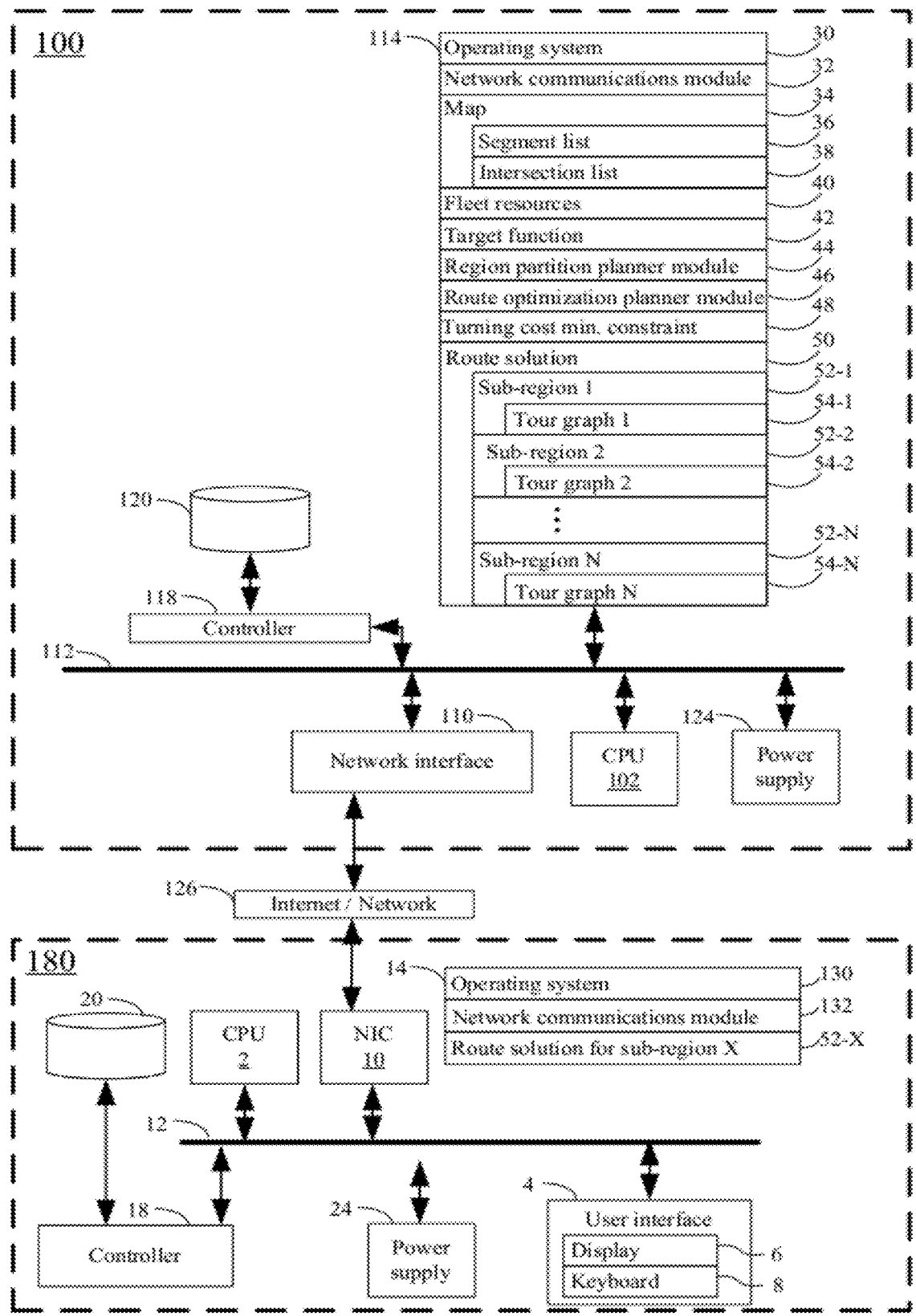
FIG. 1 illustrates a system in accordance with an embodiment of the present disclosure.

FIG. 1 illustrates the topology of an environment in accordance with the present disclosure. In the topology, there is a server 100 and one or more optional client devices 180. Of course, other topologies are possible, for instance, in some embodiments there are no client devices whereas in other embodiments there are two or more, five or more, ten or more or one hundred or more client devices 180. The exemplary topology shown in FIG. 1 merely serves to describe the features of an embodiment of the present disclosure in a manner that will be readily understood to one of skill in the art.

The server 100 will typically have one or more processing units (CPU's) 102, a network or other communications interface 110, a memory 114, one or more magnetic disk storage and/or persistent devices 120 optionally accessed by one or more controllers 118, one or more communication busses 112 for interconnecting the aforementioned components, and a power supply 124 for powering the aforementioned components. Data in memory 114 can be seamlessly shared with non-volatile memory 120 using known computing techniques such as caching. Memory 114 and/or memory 120 can include mass storage that is remotely located with respect to the central processing unit(s) 102. In other words, some data stored in memory 114 and/or memory 120 may in fact be hosted on computers that are external to the secure interface server 100 but that can be electronically accessed by the secure interface server 100 over an Internet, intranet, or other form of network or electronic cable (illustrated as element 126 in FIG. 1) using network interface 110.

Memory 114 preferably stores:
an operating system 30 that includes procedures for handling various basic system services and for performing hardware dependent tasks;
a network communication module 32 that is optionally used for connecting server 100 to other computers such as clients 100, in some embodiments the network communication module 32 includes an optional web browser, such as Microsoft Internet Explorer versions 6.0 or later, FIREFOX 2.x, FIREFOX 3.x, AOL 9, OPERA 9.5 or later, SAFARI 3.x, CHROME 2.0 or higher, and, in some embodiments, the optional web browser includes a module such as a FLASH player;
a map 34 that includes a segment list 36 and an intersection list 38;
a description of fleet resources (a plurality of servicing objects) 40;
a target function 42 for minimization;
a region partition planner module 44;
a route optimization planner module 46;
a turning cost minimization constraint 48; and
a route solution including a plurality of sub-regions 52 and, for each sub-region 52, a tour graph 54.

The server 100 is optionally connected via Internet/network 126 to one or more client devices 180. FIG. 1 illustrates the connection to only one such the client device 180. It is possible for the client device 180 to be a personal computer (e.g., desktop or laptop computer) or any form of mobile computing device (e.g., an I-PHONE, BLACKBERRY, I-PAD and the like).

In typical embodiments, a client device 180 comprises:
one or more processing units (CPU's) 2;
a network or other communications interface 10;
a memory 14;
optionally, one or more magnetic disk storage and/or persistent storage devices 20 accessed by one or more optional controllers 18;
a user interface 4, the user interface 4 including a display 6 and a keyboard or keypad 8;
one or more communication busses 12 for interconnecting the aforementioned components; and
a power supply 24 for powering the aforementioned components, which power supply can be, for example, batteries.

In some embodiments, data in memory 14 can be seamlessly shared with optional non-volatile memory 20 using known computing techniques such as caching. In some embodiments the client device 180 does not have a magnetic disk storage device. For instance, in some embodiments, the client device 180 is a portable handheld computing device and the network interface 10 communicates with the Internet/network 126 by wired or wireless means.

The memory 14 preferably stores:
an operating system 130 that includes procedures for handling various basic system services and for performing hardware dependent tasks;
a network communications module 132 that is used for connecting the client device 180 to the server 100 (FIG. 1) via one or more communication networks, such as the Internet, other wide area networks, local area networks (e.g., a local wireless network can connect the client device 180 to the server 100), metropolitan area networks, and so on; and
at least a portion of a route solution including a sub-region 52 and corresponding a tour graph 54 for the sub-region.

Figure 2:
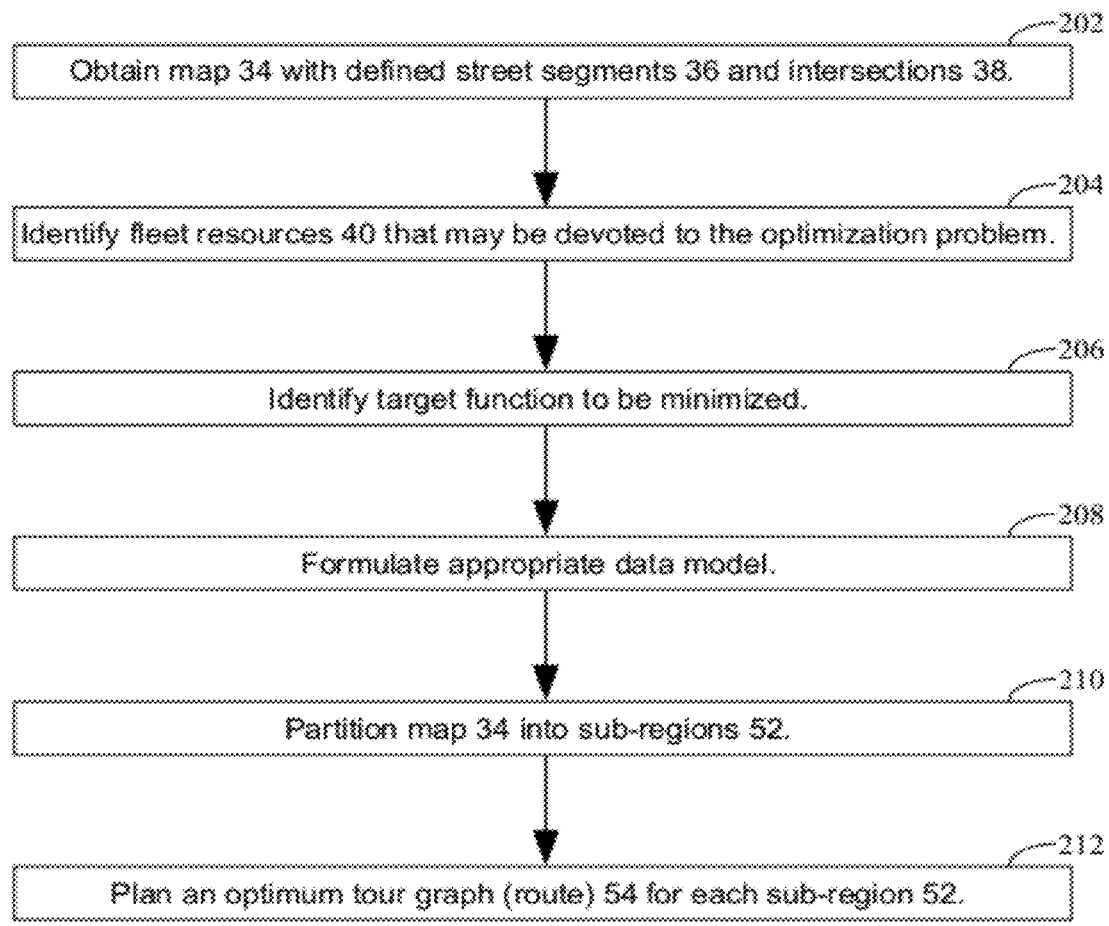
FIG. 2 illustrates a method in accordance with an embodiment of the present disclosure.

Referring to FIG. 2, an exemplary method in accordance with a first embodiment of the present disclosure is described. The method details the steps taken by server 100 to address the all-street scanning problem in accordance with the present disclosure. In this method, using a map region 34 with defined street segments 36 and intersections 38, and available fleet resources (servicing objects) 40, an optimal vehicle allocation and route is found such that every street segment within the given map region 34 is visited at least once.

Step 202.

Figure 3:
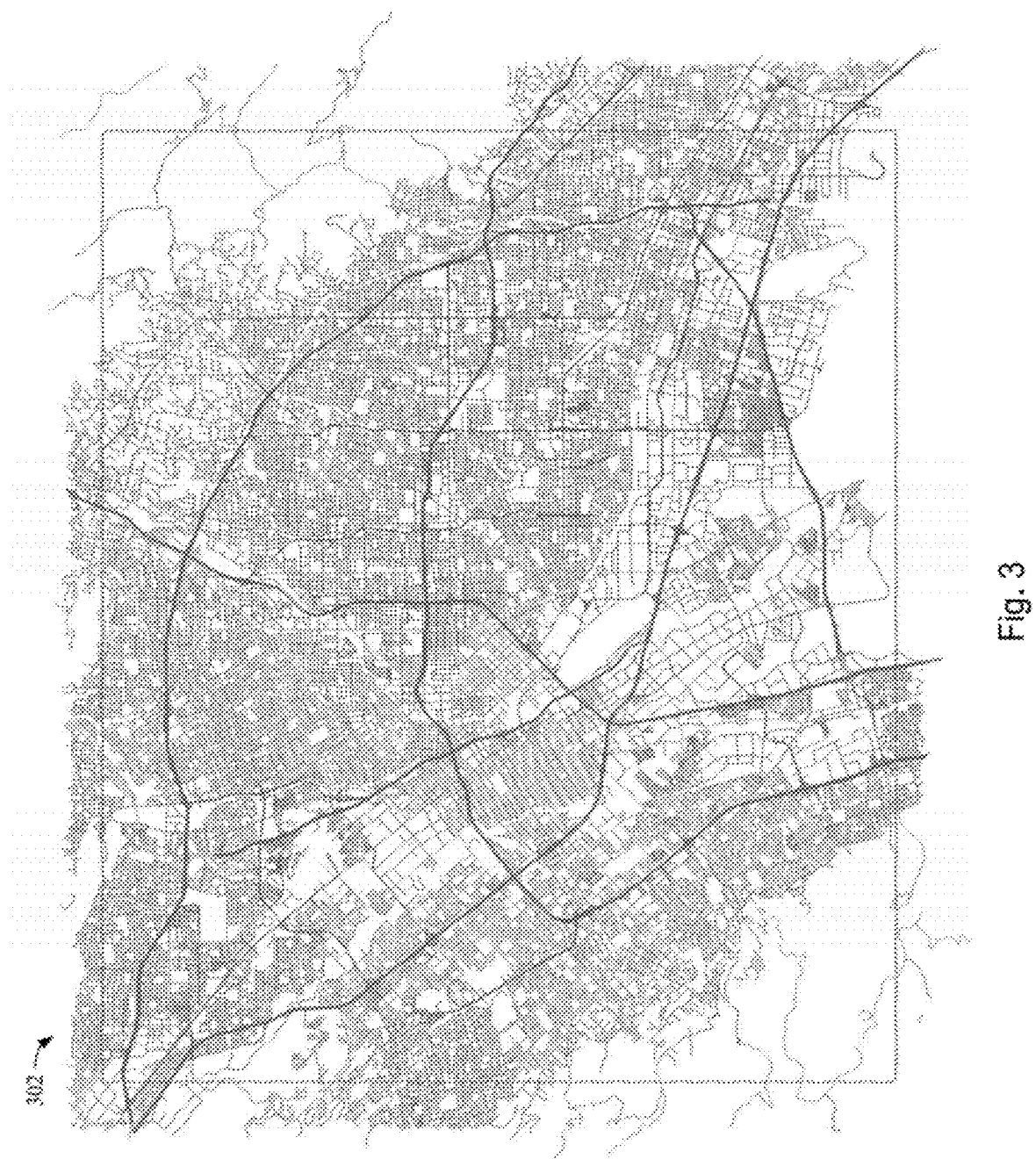
FIG. 3 illustrates a map region with defined street segments and intersections that can be used by the systems and methods described in the present disclosure.

In step 202 a map 34 is obtained. In some embodiments, the map 34 contains defined street segments 36. In some embodiments the map contains defined intersections 38. In some embodiments, the map 34 contains both defined street segments 36 and defined intersections 38. An example of such a map is map 302 of FIG. 3. In some embodiments map 34 is a map of a city, county, town, village, state, country, the world, a continent, or any combination thereof. In some embodiments, map 34 is a dataset. An example where map 34 is a dataset is given in the left hand side of FIG. 4 by a section of a segment list 36 and a section of an intersection list 38. The corresponding road segment for this segment list 36 and intersection list 38 is shown in the right hand side of FIG. 4.

Step 204.

In step 204, fleet resources 40 that may be devoted to the optimization problem are identified. Examples of fleet resource are application specific. Examples of fleet resources include a fleet of delivery vans, number of vehicles, number of salesmen, number of trains, and/or number of airplanes. For instance, in the street scanning problem, the fleet resources 40 may comprise a number of vehicles equipped to take high resolution pictures. The present systems and methods impose no limitation on the number of vans, vehicles, salesmen, trains, airplanes, etc. (generically referred to as units) that may be considered. In some embodiments, there are more than two units, more than ten units, more than 100 units, more than 1000 units, between 2 and 20,000 units, less than 100 units available, to name a few exemplary ranges.

Step 206.

In step 206, the target function 42 to be minimized is identified. For example, in one embodiment, given the maximum number of vehicles (e.g., given fleet resources 40) and hours available to work each day, the target function is to minimize the resources needed to finish the task of scanning each road in map 34. In another exemplary embodiment, given the number of days to finish the task for the given region, the objective function is to minimize the number of vehicles needed. Thus, depending on the target function 42, it is not necessarily the case that all fleet resources are utilized.

Thus, for example, in some embodiments, there may be any number of vehicles available for the task (e.g., the number of vehicles is not posed as the rate limiting factor) but the amount of time that is available is limited. In such embodiments, the target function 42 can be posited as, given the maximum number of vehicles and hours available to work each day, minimize the resources needed to finish the task for the given map 34.

Step 208.

In step 208, the appropriate data model for solving the target function is formulated. As detailed in further steps below, the methodology for vehicle allocation and routing optimization consists of two main components: the region partition planner (RPP) module 44 and the route optimization planner (ROP) module 46. In some embodiments, RPP module 44 utilizes a novel equitable convex region partition (ECRP) algorithm to subdivide a given map 34 into disjoint contiguous sub-regions 52 (based on given metrics such as total amount of roadway or any other given density function), and assign vehicles from fleet resources 40 to corresponding sub-regions 52. ROP module 46 is an innovative optimization tool that optionally utilizes a turning cost minimization (TCM) constraint 48 to generate an optimal tour graph (route) 54 for each vehicle within its assigned sub-region 52. An immediate benefit is a reduction in vehicle overhead (driving same segment of road multiple times).

The street scanning problem can be formulated as a Chinese postman problem (CPP), where a vehicle traverses each road in a network at least once, minimizing total distance traveled. It can also be modeled as a travelling salesman's problem (TSP), where each road is modeled as a node in a network graph and a vehicle traverses each node in a network at least once. The all street scanning problem is complicated by the presence of multiple vehicles with given starting points. In some embodiments, additional costs, such as intersection metrics, are considered.

Intersection Only Model (CPP).

Figure 4:
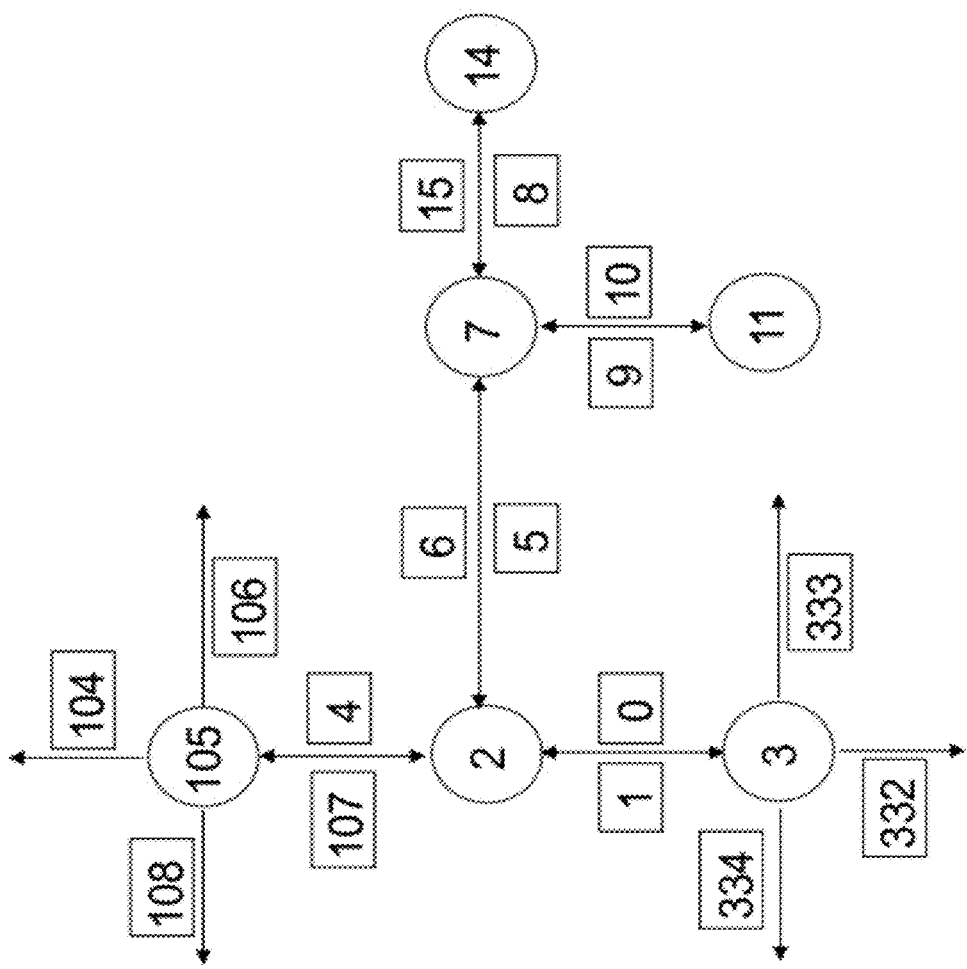
FIG. 4 illustrates a dataset example having a segment list and an intersection list and the corresponding road segment for this segment list and section of the intersection list.
Figure 5A:
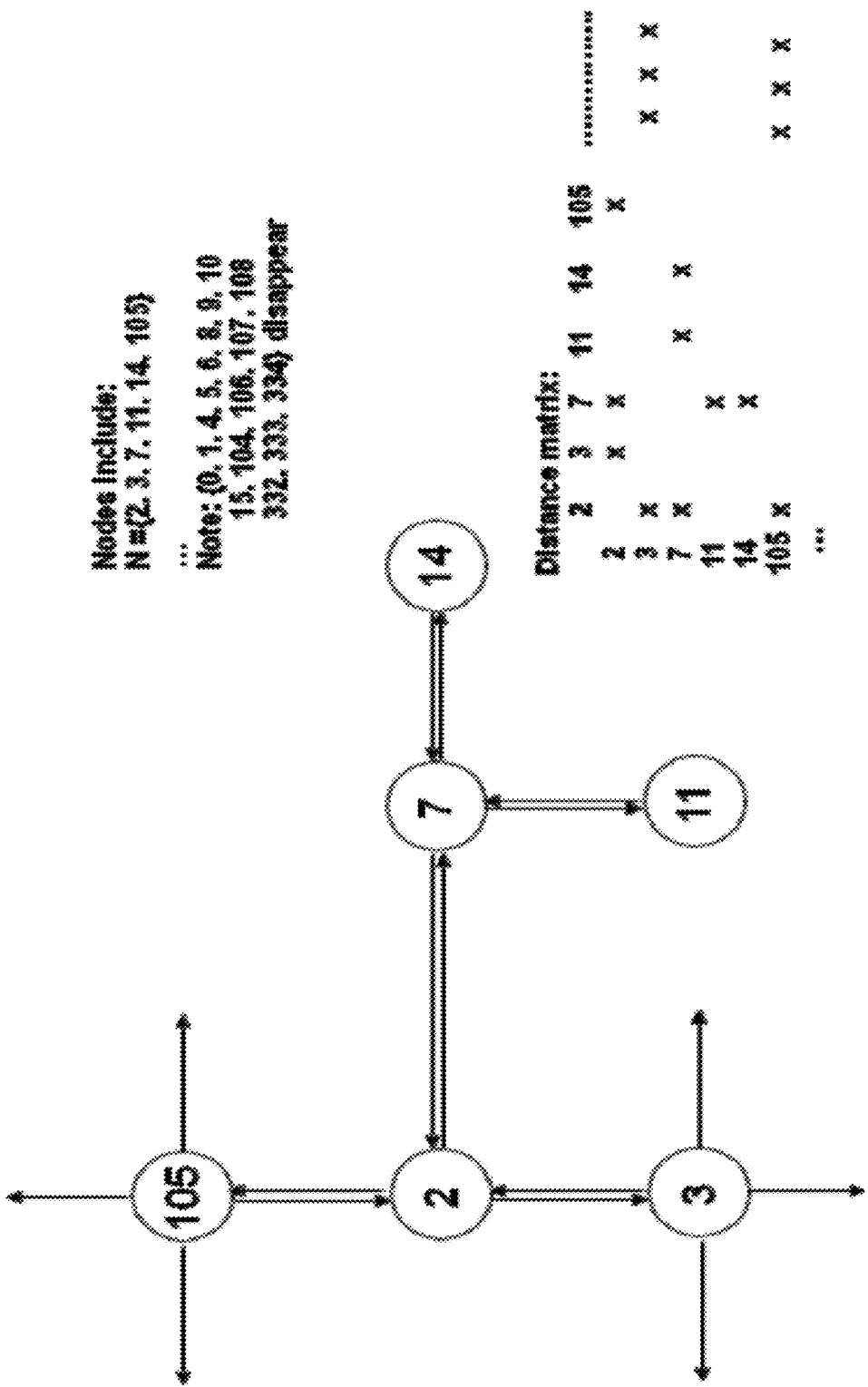
FIG. 5A illustrates the use of a distance matrix in an intersection only model in accordance with an embodiment of the systems and methods described in the present disclosure.

The road segment in the right hand side of FIG. 4 can be modeled as an intersection only CPP model. In such embodiments, nodes in the model include only intersection nodes 38. Intersection node's coordinates are taken from the last waypoint of its incoming segment. A distance matrix is calculated from the waypoints of the segment to directly connecting two intersection nodes. In such an approach, a distance matrix is utilized by the routing algorithm to represent the portion of the region given by the example in FIG. 4. This distance matrix is illustrated in FIG. 5A. After the given area is properly modeled by the CPP model, the RPP module 44 and the ROP module 46 solve the multi-vehicle routing problem in two stages: partitioning and route generation.

Segment Plus Intersection Model (TSP or CPP).

Figure 5B:
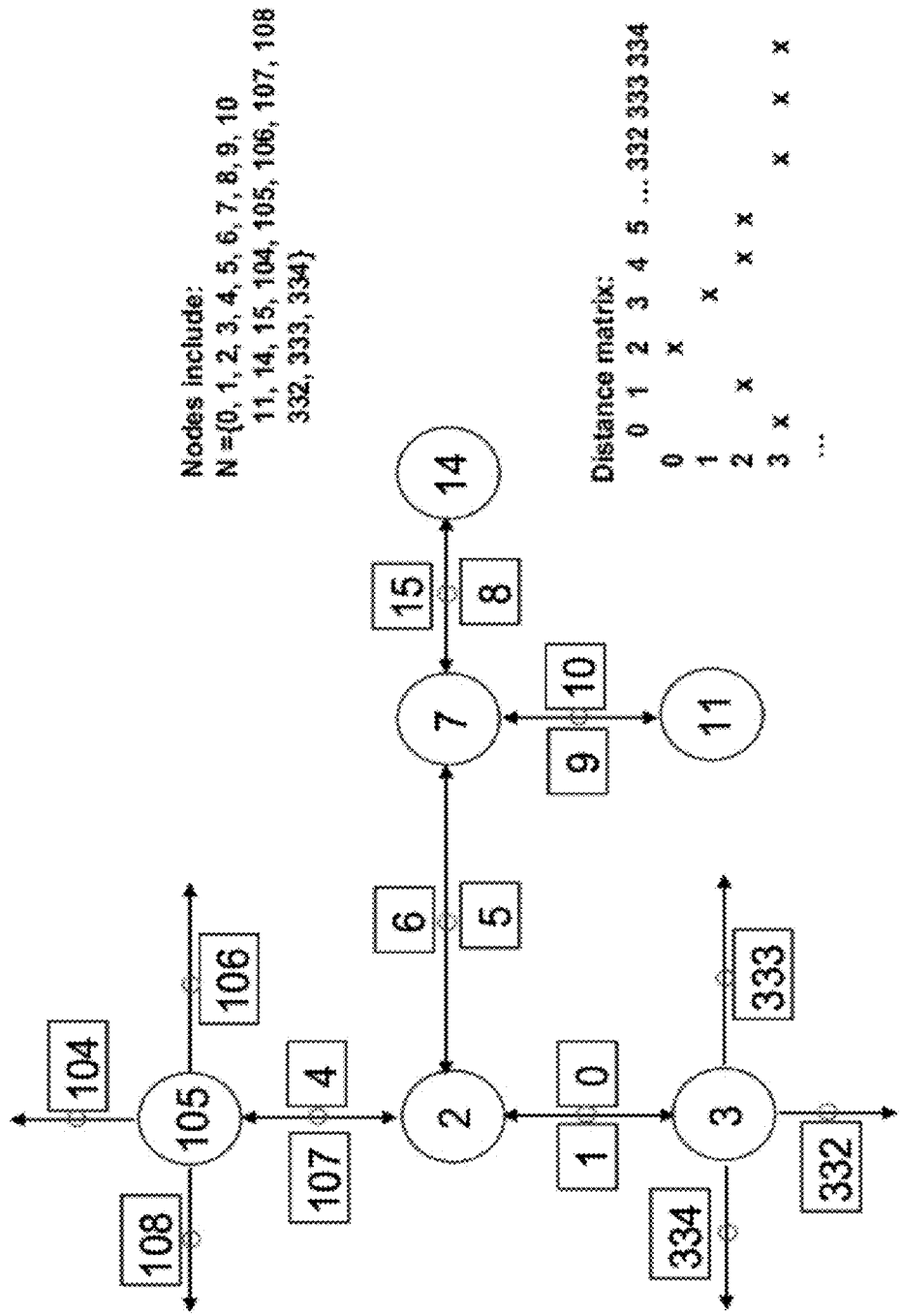
FIG. 5B illustrates the use of a distance matrix in a segment plus intersection model in accordance with an embodiment of the systems and methods described in the present disclosure.

Referring to FIG. 5B, in some embodiments, the data model is a segment plus intersection model. Nodes in the model include both segment nodes 36 and intersection nodes 38. The intersection node's coordinates are taken from the last waypoint of its incoming segment. Segment node's coordinates are taken from the mid waypoint among all its waypoints. A distance matrix is calculated from the waypoints of the segment from an intersection node to a segment node, or from a segment node to an intersection node if there are directly connected.

Segment Only Model (TSP).

Figure 5C:
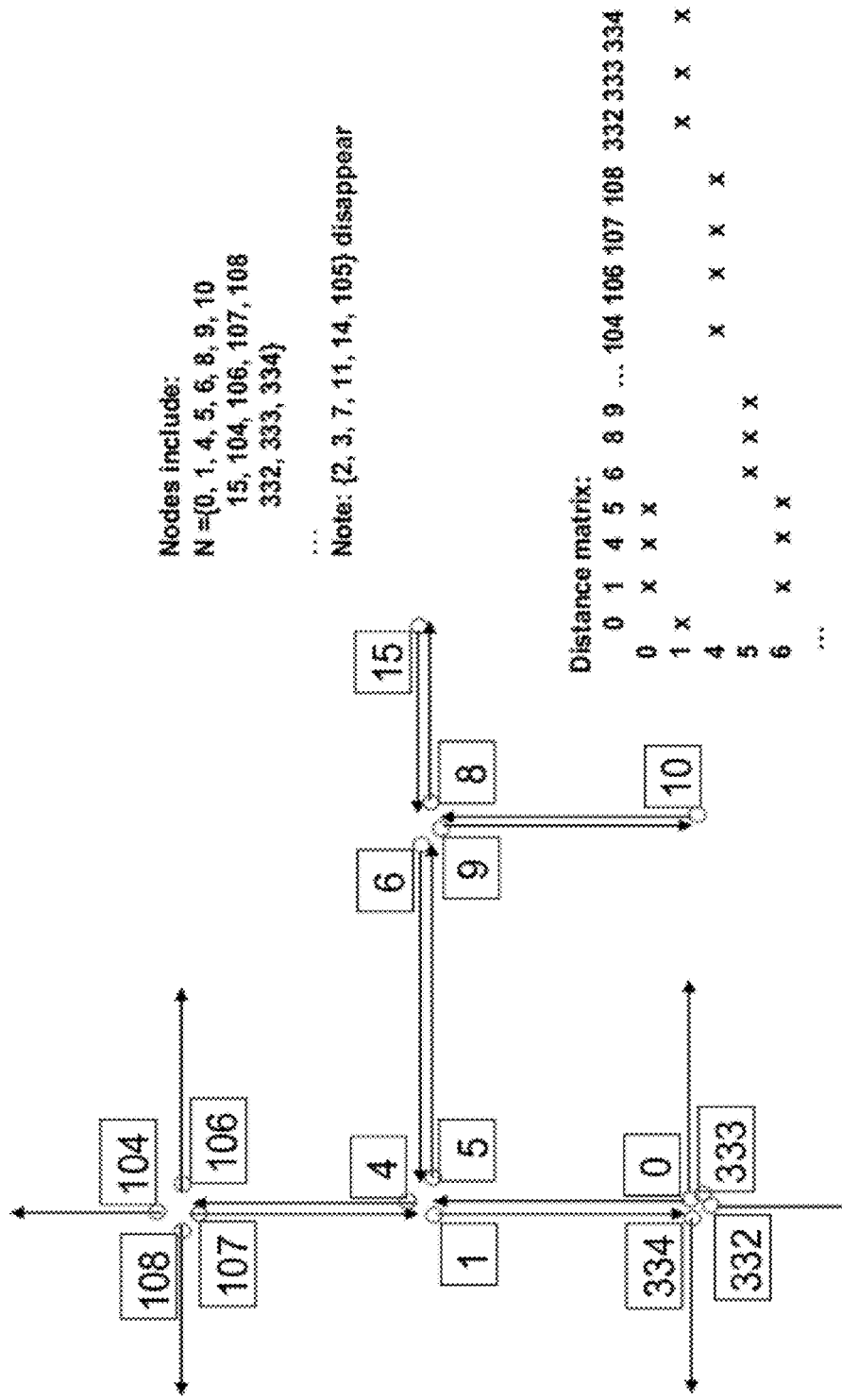
FIG. 5C illustrates the use of a distance matrix in a segment only model in accordance with an embodiment of the systems and methods described in the present disclosure.
Figure 6:
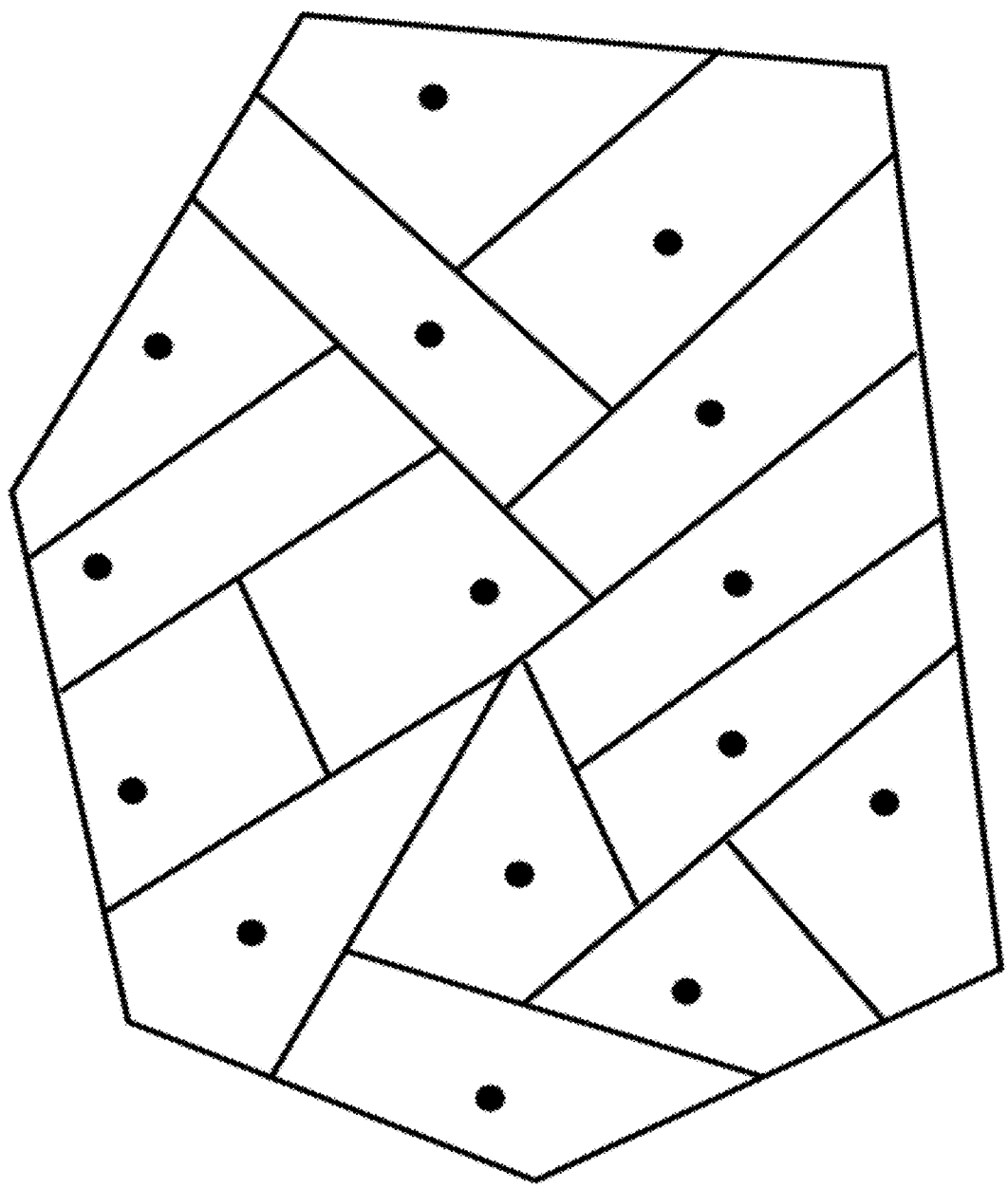
FIG. 6 illustrates a topology in which a route map has been divided into sub-regions in accordance with the systems and methods described in the present disclosure, each containing equal amounts of total road length, and where each sub-region contains a depot.

Referring to FIG. 5C, in some embodiments, the data model is a segment only model. In such embodiments, nodes in the model include only segment nodes 36. Segment node's coordinates are taken from the first waypoint among all its waypoints. A distance matrix is calculated from the waypoints of the segment to directly connected segment nodes.

Step 210.

In step 210 the map 34 is partitioned. As a pre-processing stage, the RPP module 44 first divides the map 34 into a collection of smaller sub-regions 52. In some exemplary embodiments, the map 34 is divided by RPP module 44 into two or more sub-regions 52, three or more sub-regions 52, five or more sub-regions 52, between two and one hundred sub-regions 52, or less than 20 sub-regions. In order to balance the loads of all vehicles, all sub-regions 52 preferably contain equal amounts of total road length; that is, the total lengths of all roads in each sub-region are preferably equal. When vehicles originate from various depots distributed in the network, the RPP module 44 forces each sub-region 52 to contain a depot. When no vehicle depot is given, the RPP module 44 instead minimizes the maximum diameter of each sub-region 52, e.g. the maximum distance between two points in that sub-region.

The partitioning stage involves finding a "regular" partition of a service region that optimizes some heuristic objective, or satisfies some other constraints, e.g.

equal area, equal distance traversed (same road length)
    equal area, must contain a depot
    equal distance traversed, must contain a depot
    minimize total distance traversed
    minimize maximum distance traversed
    minimize number of vehicle days The given region can be any given area that can be confined by:

any administrative region specified by the user, such as Santa Clara region map
    any region specified by an given polygon.

Suppose for example that there are n vehicles servicing customers in the area define by map 34 and that this area is a convex region C. Suppose further that the vehicles start at a set of depots P. In one application of the systems and methods of the present application, what is desired is to route the vehicles such that all customers are visited while minimizing the time until the last vehicle returns to its depot. In this example, resources are allocated to clients in a load-balanced manner. Each vehicle is allocated to the customers it will service. The routing of each vehicle from its depot, to its allocated customers, and then back to the depot in the shortest time is a traveling salesman problem. Since what is sought is to minimize the maximum travel time, it is expected that the travel times of the vehicles will be roughly equal in an optimal solution. One heuristic is to find an equitable partition of C and P (one which partitions C into n sub-regions 52 of equal area each containing one point of P). Then all customers in one part of C are assigned to the vehicle starting at the depot in that part. This heuristic is asymptotically optimal when the assumption is made that there are many customers and that their locations are independent and identically uniformly distributed in C. This is because the following theorem shows that the length of each vehicle's route is asymptotically proportional to the square root of the area of the region it services and because the equitable partition splits C into regions of equal area. Theorem: suppose that p is a point in convex set R and that $X_i$'s are random points independent and identically uniformly distributed in R. Then the length TSP(p,$X_1$, ..., $X_k$) of the optimal traveling salesman tour traversing points p and $X_1, \ldots, X_k$ satisfies $$k^{-1/2}\text{TSP}(p,X_1,\ldots,X_k) \to \alpha\sqrt{\lambda(R)}, a\cdot s.$$

As $k \to \infty$, where $\alpha$ is some constant and $\lambda(R)$ denotes the area of region R. See, Beardwood et al., 1959. Proc. Cambridge Phil. Soc. 55, 299-327, which is hereby incorporated by reference herein in it entirety.

Using a convex equitable-partition might have some further benefits. For instance, it is expected that odd-shaped regions may take longer to service than more compact regions with the same area. Convex regions also ensure that a vehicle's traveling-salesman tour remains in its service region and may be a robust way to handle some small uncertainty in the customers' exact locations.

Suppose that, instead of using traveling salesman tours to service the clients, it is desired to connect each of the clients using spanning (or Steiner) trees to some point in P so as to minimize the size of the largest tree. The theorem above holds not only for traveling salesman tours but also for minimum spanning trees and Steiner trees (but with different values of $\alpha$). See, Beardwood et al., 1959. Proc. Cambridge Phil. Soc. 55, 299-327 and Steele, 1988, Annals of Probability 16, 1767-1787, each of which is hereby incorporated by reference herein in it entirety. Hence asymptotically in the case of many clients, the optimal solution partitions C into pieces of equal area each containing one point in P (as in the above case for vehicle routing).

The reason for imposing the criterion that partitions be equal is derived the combinatorial result that specifies that the lengths of many combinatorial structures (such as TSP, Voronoi Graph, Nearest Neighbor graph) in a service region with uniformly distributed points depends only on the area of the region and the number of points in the region, asymptotically speaking:

$$\lim_{n \to \infty} L / \sqrt{n} = A \cdot \alpha$$

The same is true for the CPP model if the graph topology is given by a Delaunay triangulation. Given this, the criterion of the RPP module 44 in some embodiments is that each region contains one depot point and the same amount of road length:

Step 212.

Given the sub-regions 52 of step 210, in step 210 the ROP module 46 plans an optimum tour graph (route) 54 for each sub-region 52. This is a combinatorial optimization problem known as the Chinese postman problem (CPP). One embodiment of the present disclosure provides a customized algorithm that solves the CPP, while minimizing the number of left and U-turns that vehicles take. In considering turning costs, the input that is considered is a directed network in which the assumption is made that incoming degree equals outgoing degree for all intersections and that sibling edges have an associated "turning cost". Given this input, the goal is to obtain a tour of the graph that visits every edge and minimizes turning cost. This is an NP-hard problem. Here, turning cost is the time it takes to move from the end of one segment to the start of another segment.

In some embodiments, the metrics at intersections that are considered are the choices of turning right, going straight, turning left and U-turn. The contributing factors include: the segments' classes for both the turning from segment (FromSegClass) and turning to segment (ToSegClass) and if it is a right/left/straight/U-turn. A metric table can be generated to list the metrics for each scenario. The Right, Left, Straight, U-Turn intersection cost metrics can be user-defined, and the metrics can be any desirable parameters fitting their particular applications. In some embodiments, priority table is used to guide turning decisions at intersections. Each element in the priority table indicates the relative effort of a turn class. This relative effort could be the time unit it takes to complete the turn. In some embodiments, more granularity is added according to further classifications from the FromSegClass/ToSegClass ratio value. An exemplary priority table is set forth in Table 1 below.

| Class | Right turn | Left turn | Straight | U-turn |
|---|---|---|---|---|
| If FromSegClass/ToSegClass > 1 | 2 | 4 | 1 | 4 |
| If FromSegClass/ToSegClass < 1 | 4 | 6 | 5 | 6 |
| If FromSegClass/ToSegClass < 1 | 3 | 5 | 4 | 5 |

Figure 7:
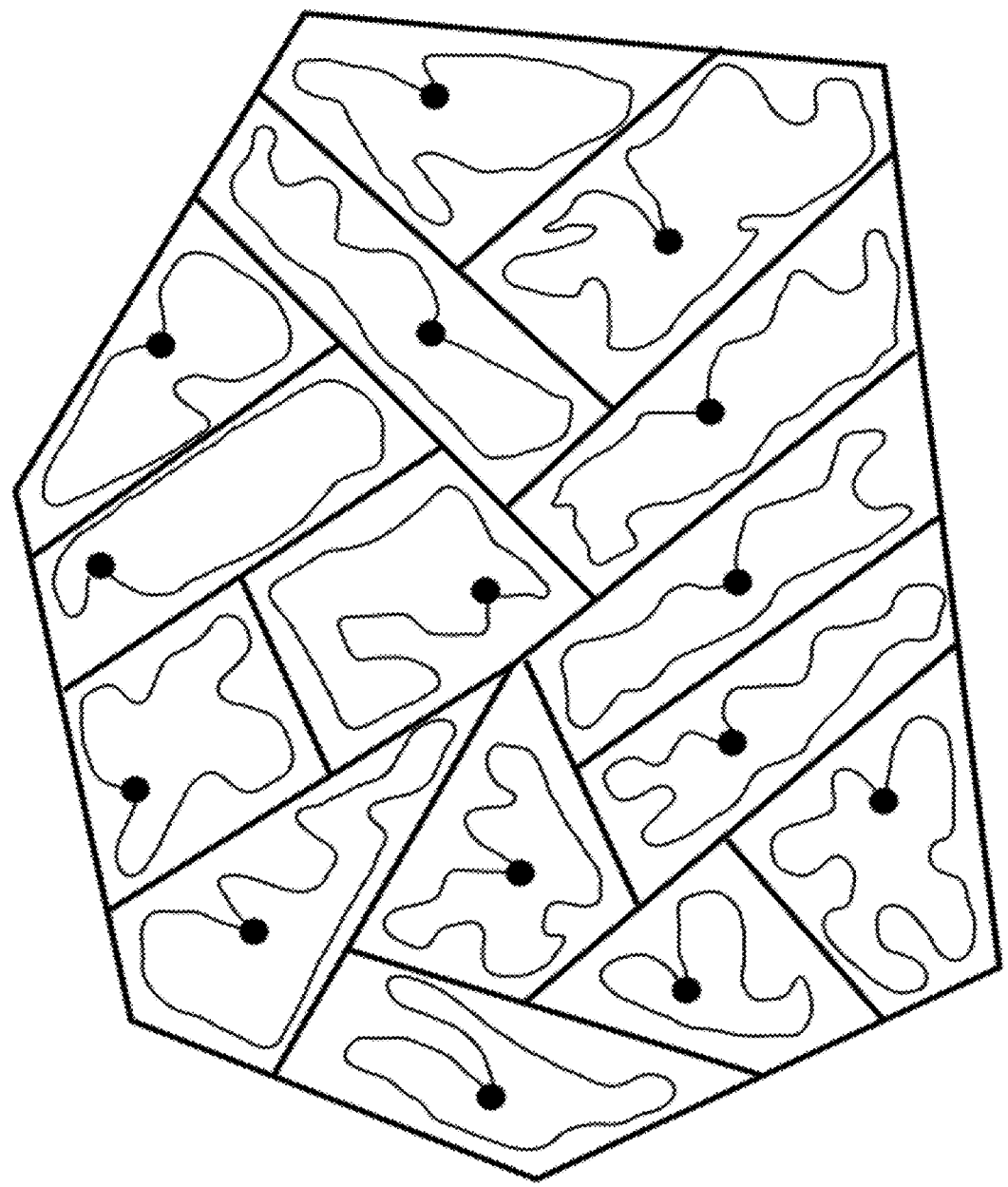
FIG. 7 illustrates a route compute in accordance with the systems and methods of present disclosure in each sub-region of a route map.

With the priority table in mind, the problem and be considered as having the following input: a directed network; assume without loss of generality that incoming degree equal outgoing degree for all intersections; sibling edges have an associated "turning cost". The goal then, is to obtain a tour of the graph that visits every edge and minimizes turning cost (NP-hard). The CPP is solved in the present disclosure with a sequence of bipartite matching problems at each intersection in order to assigning incoming edges to outgoing edges with minimum costs. Each loop is treated as a "supernode" and two supernodes are connected if their loops share a node. Each edge between supernodes is weighted with the turning costs between these two loops. A minimum spanning tree of the supernode graph is constructed. This induces a tour that visits each edge exactly once. In this way, the loops are joined together, forming a final route that the vehicle takes. Inside each sub-region, one or multi vehicle tours are generated to cover the given task. The generation of a tour graph 54 in each sub-region 52 is illustrated in FIG. 7.

Additional Constraints and Cost Functions.

The systems and methods of the present disclosure also support other constraints and cost functions for routing vehicles. For instance, in some embodiments directional scanning can be done. A given road network may consist of both one-way and two-way streets. In addition, narrow two-way streets may be traversed only once, while large two-way streets may require traversal in both directions. In such embodiments, this is addressed by using an implementation of the mixed postman algorithm to find vehicle routes in such road networks.

In some embodiments, priority scanning is done. Rather than requiring that all streets in a city be traversed, a client may only require that a subset of streets be visited. In such embodiments, an implementation of the rural postman algorithm is used to find vehicle routes in such a setting.

In some embodiments, scanning of one or more specified lanes on a given segment when there are multiple lanes in that segment is done.

In some embodiments, speed limits are considered. In such embodiments, a list of speed limits is taken as input on each road in a network. This is necessary information when the goal is to minimize the time to completion of all vehicle tours, since roads of the same length may require different amounts of time to traverse. Vehicles may also have a maximum speed limit when performing a scan.

In some embodiments, special parsers have been developed to extract given map raw data into SEGMENT LIST and INTERSECTION LIST DATA, for example the TIGER raw map data and NAVSTREET raw map data. In the case of NAVSTREET map data, a parser has been developed to extract into SEGMENT LIST, INTERSECTION LIST, and associated attributes DATA as input to our optimization route planner.

The RPP module 44 can integrate into mapping products to effectively partition (assign) tasks to resources (vehicles) in order to balance work load and provide resource planning and management. In addition, the ROP module 46 can reduce operational cost by reducing driving overhead and by minimizing turning costs. In certain applications, as illustrated in FIG. 1, the partition and route planning for each individual sub-region can be processed at a central server 100 utilizing distributed computing, and the routes can be pushed to each end device 180. This increases the speed of optimal route generation and reduces the computational need for a local device, therefore improving significantly the overall system computational performance. In certain applications, the partition and route planning offer can be implemented and hosted on a cloud server, such as Amazon cloud. The route and planning offer is also offered as a webservice that applies to any companies that would like to integrated route optimization solution into their applications. The web services can be consumed in via standard Soap 1.2 protocol web service requests, or RESTFUL services. For example, for the multi-location servicing application, the web-service method takes either a list of strings that specify lat/long pairs or specific street addresses and return an ordered list of destinations for optimized routing.

Example

Figure 10:
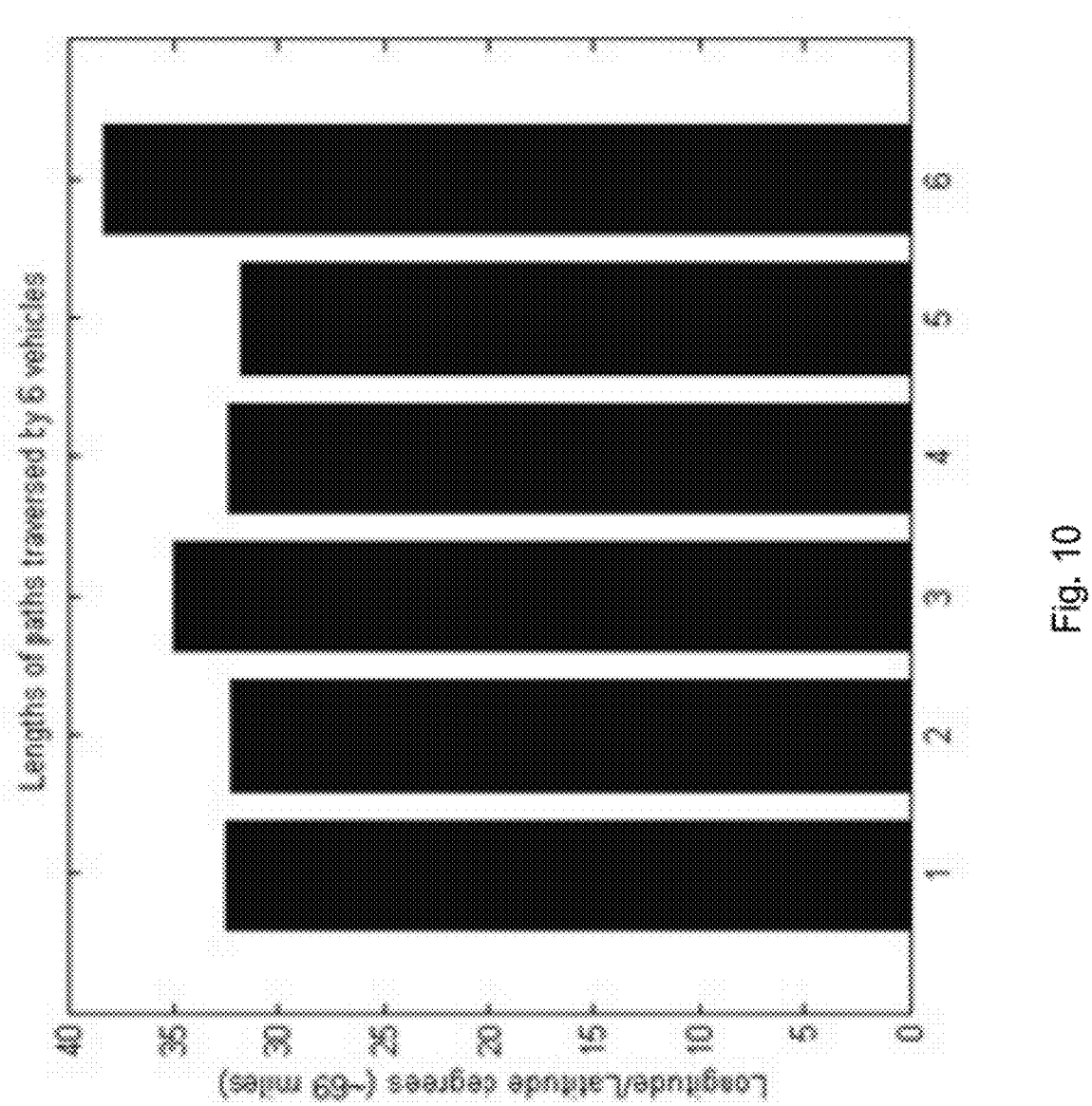
FIG. 10 shows that the maximum path length among all six vehicles used to traverse the six sub-regions of FIGS. 8 and 9 is minimized to achieve a balanced workload.

Turning to FIG. 8, a street scanning example using real data is presented. FIG. 8 shows a map of Santa Clara, Calif. after partitioning in accordance with the systems and methods of the present disclosure. A fleet of six vehicles is allocated to cover all street segments, and thus six equal partitions are identified. FIG. 9 then illustrates how a route is then drawn in accordance with the systems and methods of the present application. FIG. 10 shows that the maximum path length among all six vehicles is minimized to achieve a balanced workload. In addition, the total number of roads that are covered more than once is only around four percent in this example. Here, overhead is defined as follows:

$$\text{Overhead} = \frac{\left(\begin{array}{c}\text{total distance traveled by all vehicles} - \\ \text{total segment distances}\end{array}\right)}{\text{total segment distance}}.$$

FIG. 11 provides side by side graphs showing the effectiveness of the turning cost minimization algorithm. The figure illustrates how overall turning costs are reduced when the turning cost minimization algorithm is used. Specifically, the left hand of FIG. 11 details the results of the optimization without turning cost optimization considered whereas the right hand of FIG. 11 details the results of the optimization with turning cost considered and optimized.

Multi-Location Servicing Route Optimization Models.

Some embodiments of the present disclosure formulate the model in step 208 as a multi-location servicing route optimization type model. In other words, for a map 34 with defined street segments 36 and intersections 38, and available fleet resources 40, the optimal vehicle allocation and route is found such that every given location that needs to be serviced is visited at least once in such embodiments. Objectives can be given multiple ways, for example:

Given the maximum number of vehicles and hours available to work each day, minimize the resources needed to finish the task for the given region, or Given the number of days to finish the task for the given region, minimize the number of vehicles needed.

There are many applications for this type of multi-location servicing program problem, including, but not limited to, package/mail delivery, FEDEX, UPS, United States Postal Service, resource distribution, delivery of supplies to retail stores, such as WAL-MART, food distribution companies, such as 7-ELEVEN in Japan. An important component task for such multi-location servicing problems arises in pre-processing when routing vehicles is the assignment of resources, such as vehicles or vehicle depots, to those clients requiring service. In some embodiments, an algorithm is employed that divides a given map 34 into a collection of smaller sub-regions 52 so as to balance the loads of vehicles optimally. One of these algorithms performs a sequence of binary and ternary space partitions so as to divide the region into a collection of sub-regions 52, with each sub-region 52 containing a depot, and with all sub-regions containing the same number of client destinations to visit. Then, using a sector algorithm, these sub-regions are further refined into pieces that are assigned to individual vehicles. For irregularly shaped regions, a linear programming algorithm for assigning depots to clients is used. First, a matching problem is solved between depots and clients. In one embodiment, vehicle tours are computed for all depots using the Lin-Kernighan algorithm. Then, weights are assigned to each depot based on the lengths of the vehicle tours thus induced. The matching problem is solved again, with the new set of weights. This sequence is repeated until all vehicle tours are sufficiently balanced. After the partitioning stage is completed, optimization techniques are used to devise efficient tour graphs 54 quickly. In some embodiments, the Lin-Kernighan algorithm is used to determine the sequence in which clients should be visited. Distances between destinations are measured "as the crow flies". Once the sequence is obtained, the actual turn-by-turn routes that each vehicle takes are computed using existing implementations of the shortest-path algorithm, such as those in use by MICROSOFT BING Maps or GOOGLE Maps.

In some embodiments, enhanced services incorporate other distance measures between destinations. For example, in some embodiments, a variable distance matrix—that is, the distance between two destinations can be measured in an arbitrary way, is used. For example, in one embodiment, the actual traveling distance (as induced by a road network) between two destinations, is used rather than the "as the crow flies" approximation from a basic service. In some embodiments the travel time required to visit all destinations is minimized. In a heavily congested network, this may be different from the route minimizing the total distance. In yet another embodiment, the total fuel expenditure on a route is minimized by measuring the distance between two destinations as the average amount of fuel required to travel between those destinations. Information needed to derive such quantities for United States based routes can be obtained from the United States Department of Transportation (USDOT) fuel economy profiles.

In some embodiments, a custom modification of the Lin-Kernighan algorithm is used to solve problems in which destinations are also constrained by time in some way. In particular, clients may require some amount of service time to be performed at their destination. Constraints that vehicles are only allowed to visit destinations during a specified time window may also be imposed. These constraints can be enforced by taking advantage of the iterative property of the Lin-Kernighan algorithm: that is, the Lin-Kernighan algorithm builds a route by sequentially performing small modifications to a given route. Thus, provided the constraints are enforced at each iteration, it can be guaranteed that the final route must also obey these constraints. Such constraints are additionally enforced in some embodiments by imposing a penalty parameter on routes in which large amounts of time are wasted. This occurs when a vehicle arrives at a destination before the beginning of that destination's time window, and thus the vehicle must sit idly until the time window begins.

In some embodiments, a custom modification of the Chinese Postman Problem, the so called Rural Postman Problem, is addressed. The Rural Postman Problem is an extension of the Chinese Postman Problem. For a rural postman problem, only a subset of the edges from a given graph is required to be traversed at least once. So, the objective is to cover all the edges inside this subset at least once while utilizing the whole given graph minimizing cost of a given metric. This problem is particularly useful in practical applications of solving the Street Scanning problem because it can be used for route planning when the following situations occur:

Re-planning: replanning of already planned routes can happen when a vehicle missed certain roads due to construction, traffic condition, weather condition etc. When doing the replanning, only the missed street segments need to be traversed on again.

Priority Scan: There are situations when it is important that only certain street segment bearing certain attributions (such as Functional Class Range) need to be scanned first. The street segments that satisfy these Class Range will form the subset of the region that need to be scanned. The rest of the road segment in the region can be traversed only when necessary for scanning the segment inside the subset at least once.

The rural postman problem consists of finding a minimum-cost path for a vehicle that traverses the links in a given subset of all the road links in a network. In one embodiment of the present disclosure, this problem is addressed using a four-stage process:

1) Condense the road network by replacing all non-required links with the shortest path between two required nodes. Thus, each link is either a required link, or adjacent to a required link.

2) Form a minimum spanning tree that connects all of the required nodes together, using non-required links.

3) Perform a local search heuristic on the minimum spanning tree from step (2) to give all nodes the same incoming and outgoing degree, by solving a sequence of minimum-cost flow problems. After completing this stage, all nodes have the same incoming and outgoing degree; some nodes may additionally have undirected edges incident to them as well.

4) Make a non-bipartite matching between all edges having an odd number of undirected edges incident to them, where the weight between two nodes is equal to the cost of the shortest path between the two.

Step 4 outputs an eulerian graph that contains all of the required links, and we can now proceed with the problem as if it were a conventional multi-vehicle Chinese Postman Problem.

Optimization Parameters.

In some embodiments, optimization parameters are considered in developing routes. Such parameters include, but are not limited to, any combination of (i) road data (e.g., static data such proximity/real driving distances, or real time traffic updates), (ii) location (e.g., servicing time windows, servicing time duration, service types, task priority), (iii) resource constraints (e.g., vehicle capacity, types, availability, driver skills, availability, (iv) road limitations (e.g., for truck operations) such as speed, weight, and/or height, (v) road segment functional class range, or any attributes that are associated to segments and or intersection data.

Truck Routing.

Some embodiments of the present disclosure support the use of GIS shapefile data to devise routes that are feasible for large vehicles. For example, a loaded truck may exceed the weight limit on a bridge or the height threshold at an overpass. A truck carrying pressurized contents may have a limit on the maximum altitude at which it can travel. In such embodiments, the systems and methods of the present disclosure are able to take such factors into account by performing modifications to the road network, such as removing forbidden road links.

Variable Resolution Scanning.

In some embodiments, there is a need for portions of a map 34 to be scanned at high resolution and for portions of the map 34 to scanned at low resolution using fleet resources 40 that comprises both high resolution and low resolution vehicles. The systems and methods of the present disclosure contemplate at least two embodiments for addressing such a situation.

In option one the areas for high and low resolution scanning are covered by using high resolution vehicles in the fleet resources 40 to cover as much as they can and then use to up the rest of the vehicles. In this option, the problem is posed as a two stage problems. The first stage is to have the high end vehicles cover all the high resolution segments as much as they can and, if they are still available, they can cover then low resolution segments. The second stage involves using the rest of the vehicles in the fleet resources (e.g., the low resolution vehicles) for the remaining segments.

In option two, only the high resolution vehicles are used to cover high resolution segments of the map 34. In this option, the problem is also separated into two problems: one for the high resolution vehicles and the other for the rest of the vehicles (e.g., the low resolution vehicles in the fleet resources 40 to cover the low resolution segments. In this second option, the planning can be done in parallel using the methods disclosed herein.

Replanning.

The systems and methods of the present disclosure support high level daily planning. For example, daily replanning of the assignment of the vehicles and their routes according to sentimental factors (weather change, activity blockage, road constructions, etc.) can be done. Furthermore, real-time re-route planning is support. This arises for instance when a driver has made a wrong turn. This real-time replanning tool is also able to correct for false route information (e.g., if the route was determined with the assumption that a certain segment is available, but in real situation that segment is blocked). The replanning tool can be equipped with a simple interface for the driver to inform the replanner to incorporate this updated information for the replanning.

Incomplete Scans.

In some embodiments, the systems and methods of the present disclosure will compute solutions for scanning 100% of the roads in the map 34. More typically, the systems and methods of the present disclosure will compute solutions that scan less than 100% of the roads in the map 34. In such embodiments a cost versus benefit analysis is done which declares completion when the cost of scanning the rest of the segments is 'higher' than the benefit.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a computer readable storage medium. For instance, the computer program product could contain the program modules shown in FIG. 1. These program modules can be stored on a CD-ROM, DVD, magnetic disk storage product, or any other tangible computer readable data or program storage product.

Embodiments of the present application have been illustrated with a server 100 that contains a region partition planner module 44 and a router optimization planner module 46. It will be appreciated that these module may be part of a software program or package run or they may be standalone applications. Moreover, the present disclosure encompasses software that can perform any or all of the steps illustrated in FIG. 2.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed:

1. A computer system for allocating and routing a plurality of vehicles within a map of a geographic region such that work load is balanced across the plurality of vehicles, the computer system comprising:
   one or more processing units;
   a memory, coupled to at least one of the one or more processing units, the memory storing one or more programs that are executed by at least one of the one or more processing units, the one or more programs comprising instructions for determining a route plan for each vehicle of the plurality of vehicles, by:
   (A) formulating a model for allocating and routing the plurality of vehicles in the geographic region, wherein the model comprises a distance matrix based upon a first plurality of segments or a second plurality of intersections in the map;
   (B) partitioning the map into a plurality of disjoint contiguous sub-regions in view of the distance matrix using an equitable convex region partition algorithm;
   (C) calculating a corresponding tour graph for two or more respective sub-regions in the plurality of sub-regions, wherein, for each of the two or more respective sub-regions in the plurality of sub-regions, a vehicle in the plurality of vehicles is assigned to the tour graph that corresponds to the respective sub-region; and
   (D) outputting route plans for two or more of vehicles the plurality of vehicles, each output route plan specifying a route to be traversed by a corresponding vehicle in accordance with the tour graph calculated for at least one sub-region in the plurality of sub-regions.

2. The computer system of claim 1, wherein the model is a segment plus intersection model and wherein the distance matrix is based upon the first plurality of segments and the second plurality of intersections.

3. A computer program product for use in conjunction with a computer system, the computer program product comprising a non-transitory computer readable storage medium and a computer program mechanism embedded therein, the computer program mechanism for allocating and routing a plurality of vehicles within a geographic region such that work load is balanced across the plurality of vehicles, the computer program mechanism comprising computer executable instructions for determining a route plan for each vehicle of the plurality of vehicles, by:
   (A) formulating a model for allocating and routing the plurality of vehicles in the geographic region, wherein the model comprises a distance matrix based upon a first plurality of segments or a second plurality of intersections in the map;
   (B) partitioning the map into a plurality of disjoint contiguous sub-regions in view of the distance matrix using an equitable convex region partition algorithm;
   (C) calculating a corresponding tour graph for two or more respective sub-regions in the plurality of sub-regions, wherein, for each of the two or more respective sub-regions in the plurality of sub-regions, a vehicle in the plurality of vehicles is assigned to the tour graph that corresponds to the respective sub-region; and
   (D) outputting route plans for two or more of the vehicles in the plurality of vehicles, each output route plan specifying a route to be traversed by a corresponding vehicle in accordance with the tour graph calculated for at least one sub-region in the plurality of sub-regions.

4. The computer program product of claim 3, wherein the model is a segment plus intersection model and wherein the distance matrix is based upon the first plurality of segments and the second plurality of intersections.

5. The computer system of claim 1, wherein the (C) calculating the corresponding tour graph for two or more respective sub-regions in the plurality of sub-regions includes:
   calculating the corresponding tour graph for each of the two or more respective sub-regions in the plurality of sub-regions in accordance with at least one factor selected from the group consisting of:
   (i) a direction associated with a segment in the plurality of segments;
   (ii) a priority associated with the segment;
   (iii) one or more characteristic associated with a particular lane in a plurality of lanes associated with the segment;
   (iv) a speed limit associated with the segment;
   (v) a road condition associated with the segment; and
   (vi) an occurrence of an-unplanned event associated with the segment.

6. The computer system of claim 1, wherein the at least one sub-region is associated with a first client destination and a second client destination, and the tour graph corresponding to the at least one sub-region is calculated in accordance with at least one of:
   (i) time associated with travelling between the first client destination and the second client destination;
   (ii) fuel expenditure associated with travelling between the first client destination and the second client destination;

(iii) a service time constraint associated with the first client destination; and
(iv) time associated with performing a service at the first client destination.

7. The computer system of claim 1, wherein a vehicle in the plurality of vehicles corresponds to a street-scanning vehicle.

8. The computer system of claim 1, wherein a vehicle in the plurality of vehicles corresponds to a delivery vehicle.

9. The computer system of claim 1, wherein a vehicle in the plurality of vehicles corresponds to a pick-up vehicle.

10. The computer system of claim 1, wherein each segment in the plurality of segments corresponds to a street travelable by a vehicle, and each intersection in the plurality of sections corresponds to a street intersection reachable by a vehicle.

11. The computer system of claim 1, wherein the one or more programs further comprise instructions for:
in response to occurrence of a predefined event,
(E) calculating an updated tour graph for a first sub-region in the plurality of sub-regions, in accordance with the predefined event; and
(F) outputting an updated route plan, specifying an updated route to be traversed by a respective vehicle, the updated route plan corresponding to the updated tour graph for the first sub-region.

12. The computer system of claim 11, wherein the predefined event is an event occurs at real time.

13. The computer system of claim 1, wherein at least one tour graph includes a portion of, but less than all, segments included in the corresponding sub-region.

14. The computer system of claim 1, wherein at least one tour graph includes all segments included in the corresponding sub-region.

15. The computer program product of claim 3, wherein the instructions for (C) calculating the corresponding tour graph for two or more respective sub-regions in the plurality of sub-regions include instructions for:
calculating the corresponding tour graph for two or more respective sub-regions in the plurality of sub-regions in accordance with at least one factor selected from one of:
(i) a direction associated with a segment in the plurality of segments;
(ii) a priority associated with the segment;
(iii) one or more characteristic associated with a particular lane in a plurality of lanes associated with the segment;
(iv) a speed limit associated with the segment;
(v) a road condition associated with the segment; and
(vi) an occurrence of an-unplanned event associated with the segment.

16. The computer program product of claim 3, wherein the at least one sub-region is associated with a first client destination and a second client destination, and the tour graph corresponding to the at least one sub-region is calculated in accordance with at least one of:
(i) time associated with travelling between the first client destination and the second client destination;
(ii) fuel expenditure associated with travelling between the first client destination and the second client destination;
(iii) a service time constraint associated with the first client destination; and
(iv) time associated with performing a service at the first client destination.

17. The computer program product of claim 3, wherein a vehicle in the plurality of vehicles corresponds to a street-scanning vehicle.

18. The computer program product of claim 3, wherein a vehicle in the plurality of vehicles corresponds to a delivery vehicle.

19. The computer program product of claim 3, wherein a vehicle in the plurality of vehicles corresponds to a pick-up vehicle.

20. The computer program product of claim 3, wherein each segment in the plurality of segments corresponds to a street travelable by a vehicle, and each intersection in the plurality of sections corresponds to a street intersection reachable by a vehicle.

21. The computer program product of claim 3, wherein the one or more programs further comprises instructions for:
in response to occurrence of a predefined event,
(E) calculating an updated tour graph for a first sub-region in the plurality of sub-regions, in accordance with the predefined event; and
(F) outputting an updated route plan, specifying an updated route to be traversed by a respective vehicle, the updated route plan corresponding to the updated tour graph for the first sub-region.

22. The computer program product of claim 21, wherein the predefined event is an event that occurs at real time.

23. The computer program product of claim 3, wherein at least one tour graph includes a portion of, but less than all, segments included in the corresponding sub-region.

24. The computer program product of claim 3, wherein at least one tour graph includes all segments included in the corresponding sub-region.

25. A computer-implemented method for allocating and routing a plurality of vehicles within a map of a geographic region such that work load is balanced across the plurality of vehicles, the method comprising:
at a computing system having at least one processor,
determining a route plan for each vehicle of the plurality of vehicles, by:
(A) formulating a model for allocating and routing the plurality of vehicles in the geographic region, wherein the model comprises a distance matrix based upon a first plurality of segments or a second plurality of intersections in the map;
(B) partitioning the map into a plurality of disjoint contiguous sub-regions in view of the distance matrix using an equitable convex region partition algorithm;
(C) calculating a corresponding tour graph for two or more respective sub-regions in the plurality of sub-regions, wherein, for each of the two or more respective sub-regions in the plurality of sub-regions, a vehicle in the plurality of vehicles is assigned to the tour graph that corresponds to the respective sub-region; and
(D) outputting route plans for two or more of vehicles of the plurality of vehicles, each output route plan specifying a route to be traversed by a corresponding vehicle in accordance with the tour graph calculated for at least one sub-region in the plurality of vehicles.

26. The computer-implemented method of claim 25, wherein the model is a segment plus intersection model and wherein the distance matrix is based upon the first plurality of segments and the second plurality of intersections.

27. The computer-implemented method of claim 25, wherein the (C) calculating the corresponding tour graph for two or more respective sub-regions in the plurality of sub-regions include instruction for:

calculating the corresponding tour graph for each of the two or more respective sub-regions in the plurality of sub-regions in accordance with at least one factor selected from one of:
- (i) a direction associated with a segment in the plurality of segments;
- (ii) a priority associated with the segment;
- (iii) one or more characteristic associated with a particular lane in a plurality of lanes associated with the segment;
- (iv) a speed limit associated with the segment;
- (v) a road condition associated with the segment; and
- (vi) an occurrence of an-unplanned event associated with the segment.

28. The computer-implemented method of claim 25, wherein the at least one sub-region is associated with a first client destination and a second client destination, and the tour graph corresponding to the at least one sub-region is calculated in accordance with at least one of:
- (i) time associated with travelling between the first client destination and the second client destination;
- (ii) fuel expenditure associated with travelling between the first client destination and the second client destination;
- (iii) a service time constraint associated with the first client destination; and
- (iv) time associated with performing a service at the first client destination.

29. The computer-implemented method of claim 25, wherein a vehicle in the plurality of vehicles corresponds to a street-scanning vehicle.

30. The computer-implemented method of claim 25, wherein a vehicle in the plurality of vehicles corresponds to a delivery vehicle.

31. The computer-implemented method of claim 25, wherein a vehicle in the plurality of vehicles corresponds to a pick-up vehicle.

32. The computer-implemented method of claim 25, wherein each segment in the plurality of segments corresponds to a street travelable by a vehicle, and each intersection in the plurality of sections corresponds to a street intersection reachable by a vehicle.

33. The computer-implemented method of claim 25, wherein the one or more programs further comprising instructions for:
in response to occurrence of a predefined event,
- (E) calculating an updated tour graph for a first sub-region in the plurality of sub-regions, in accordance with the predefined event; and
- (F) outputting an updated route plan, specifying an updated route to be traversed by a respective vehicle, the updated route plan corresponding to the updated tour graph for the first sub-region.

34. The computer-implemented method of claim 33, wherein the predefined event is an event occurs at real time.

35. The computer-implemented method of claim 25, wherein at least one tour graph includes a portion of, but less than all, segments included in the corresponding sub-region.

36. The computer-implemented method of claim 25, wherein at least one tour graph include all segments included in the corresponding sub-region.

* * * * *